United States Patent [19]

Tysver

[11] Patent Number: 5,054,592

[45] Date of Patent: Oct. 8, 1991

[54] MANUAL/POWERED OPERATION SAFETY DEVICE

[75] Inventor: John D. Tysver, Rockford, Ill.

[73] Assignee: Sundstrand Corporation, Rockford, Ill.

[21] Appl. No.: 515,666

[22] Filed: Apr. 25, 1990

Related U.S. Application Data

[63] Continuation of Ser. No. 222,785, Jul. 22, 1988, abandoned.

[51] Int. Cl.⁵ .............................................. F16D 67/00
[52] U.S. Cl. ..................................... 192/8 R; 74/625
[58] Field of Search ................... 74/625; 192/8 R, 94, 192/12 R, 15

[56] References Cited

U.S. PATENT DOCUMENTS

| | | | |
|---|---|---|---|
| 1,306,652 | 6/1919 | Wilson | 74/720.5 |
| 1,465,796 | 8/1923 | Twomley | 74/766 |
| 1,671,759 | 5/1928 | Bendix | 188/234 |
| 1,764,405 | 6/1930 | Hill et al. | 74/625 |
| 1,818,334 | 8/1931 | Kazenmaier et al. | 188/167 |
| 2,020,404 | 11/1935 | Farkas | 188/77 W |
| 2,159,983 | 5/1939 | Colby | 74/710.5 |
| 2,219,518 | 10/1940 | Engle et al. | 188/106 P |
| 2,258,307 | 10/1941 | Vickers | 192/8 R |
| 2,346,175 | 4/1944 | Matson | 188/354 |
| 2,387,215 | 10/1945 | Fawkes | 74/625 |
| 2,621,543 | 12/1952 | Rossmann | 74/625 |
| 2,665,904 | 1/1954 | Lehmann | 74/625 |
| 2,776,032 | 1/1957 | Kellogg | 192/141 |
| 3,198,033 | 8/1965 | Fry | 74/625 |
| 3,877,550 | 4/1975 | Hahn | 188/106 P |
| 3,935,932 | 2/1976 | Moorhouse | 192/13 R |
| 4,014,579 | 3/1977 | Dubois | 188/170 X |
| 4,116,113 | 9/1978 | Leclerc | 188/170 X |
| 4,258,958 | 3/1981 | Bloxham | 303/6 A |
| 4,283,968 | 8/1981 | Kalns | 74/701 |
| 4,407,547 | 10/1983 | Edwards | 303/6 A |
| 4,505,519 | 3/1985 | Muterel | 303/6 A |
| 4,550,811 | 11/1985 | Rumsey | 188/170 |
| 4,605,358 | 8/1986 | Burandt | 417/236 |
| 4,706,785 | 11/1987 | Hartz | 188/106 F |

FOREIGN PATENT DOCUMENTS

| | | | |
|---|---|---|---|
| 547881 | 10/1957 | Canada | 74/625 |
| 897852 | 4/1945 | France | 74/625 |

Primary Examiner—Allan D. Herrmann
Assistant Examiner—Nicholas Whitelaw
Attorney, Agent, or Firm—Wood, Phillips, Mason, Recktenwald & VanSanten

[57] ABSTRACT

A safety device for a drive unit adapted for manual and powered driven movement of a drive shaft. The safety device includes a brake operably associated with the drive shaft for preventing manual and powered driven movement of the drive shaft. It also includes a manual input for releasing the brake and effecting manual driven movement of the drive shaft and a powered input for releasing the brake and effecting powered driven movement of the drive shaft. With this arrangement, the safety device is such that the powered input is operable to disengage the manual input before effecting powered driven movement of the drive shaft.

11 Claims, 1 Drawing Sheet

5,054,592

MANUAL/POWERED OPERATION SAFETY DEVICE

FIELD OF THE INVENTION

This application is a continuation of application Ser. No. 222,785, filed July 22, 1988 now abandoned.

The present invention generally relates to drive units adapted for both manual and powered driven movement and, more particularly, to a safety device for such drive units capable of disengaging the manual input prior to operating the powered input.

BACKGROUND OF THE INVENTION

The use of power drive units for a wide variety of applications is well known. In some applications, it is desirable to provide both manual and powered driven movement of a drive shaft depending upon the requirements at a given point in time. However, with such dual drive systems, there is an inherent danger to the manual operator.

More specifically, if a powered input is activated while utilizing a manual input, the manual operator may be exposed to possible serious injury. This could occur, for instance, because of feedback of the powered input through the manual input due to the manner in which the two inputs are linked to the drive shaft. For this reason, it is important to provide a manner of protecting the operator from such harm.

In other words, human safety considerations require that concurrent manual/powered operation be rendered essentially impossible. By way of example, this is important in a door/pallet hydraulic drive unit of the type utilized in connection with cargo aircraft. In such application, there is usually provided a brake for the door and/or pallet requiring release prior to movement of the drive shaft.

For maximum utility, it would be desirable to have both manual and powered means not only for driving a shaft but also for releasing the brake or brakes. This would render it possible to have maximum versatility at all stages of use of the system. However, as previously noted, any such system must include a safety device capable of precluding concurrent manual/powered operation.

The present invention is directed to overcoming the above stated problems and accomplishing the stated objects.

SUMMARY OF THE INVENTION

It is a principal object of the present invention to provide a safety device for a drive unit adapted for manual and powered driven movement of a drive shaft. More specifically, it is an object of the invention to provide such a safety device incorporating manual input means for releasing brake means and effecting manual driven movement of the drive shaft and also incorporating powered input means for releasing the brake means and effecting powered driven movement of the drive shaft. It is likewise an object of the invention to provide such a safety device where the powered input means is operable to disengage the manual input means before effecting powered driven movement of the drive shaft the brake means normally being engaged.

An exemplary embodiment of the invention achieves the foregoing objects in a safety device wherein the brake means is operatively associated with the drive shaft except when the brake means has been released by either the manual input means or the powered input means whereby the powered input means disengages the manual input means in a manner avoiding potential harm to the manual operator.

In a preferred embodiment, the drive unit includes a spring compression shaft coaxial with the drive shaft whereby the brake means is released by axial movement of the drive shaft and the spring compression shaft. The drive shaft is axially movable responsive to operation of the manual input means and the powered input means. Further, the brake means includes a brake mounted on the drive shaft for pivotal movement from an engaged brake position to a released brake position such that axial movement of the drive shaft causes the pivotal movement of the brake.

Still further, the manual input means preferably includes axially separable gear means operable through manual drive means. The axially separable gear means advantageously includes a first gear portion operatively associated with the manual input means and a second gear portion operably associated with the drive shaft. Preferably, the manual input means is adapted to drive the drive shaft through the first and second gear portions.

Additionally, the manual input means preferably includes a ball ramp gear disposed between the manual drive means and the first gear portion. The first gear portion is then operably associated with the manual input means through the ball ramp gear. Moreover, biasing means is advantageously provided between the first and second gear portions to apply a biasing force tending to disengage the first and second gear portions.

As for the powered input means, it preferably includes override means associated with the spring compression shaft and the drive shaft. The override means is then adapted to move the spring compression shaft and the drive shaft axially for releasing the brake means. With this construction, the powered input means also preferably includes motor means for powered driven movement of the drive shaft after the brake means has been released.

Other objects, advantages and features of the present invention will become apparent from the following specification taken in conjunction with the accompanying drawings.

DETAILED DESCRIPTION OF THE PREFERRED EMBODIMENT

Figure 1:
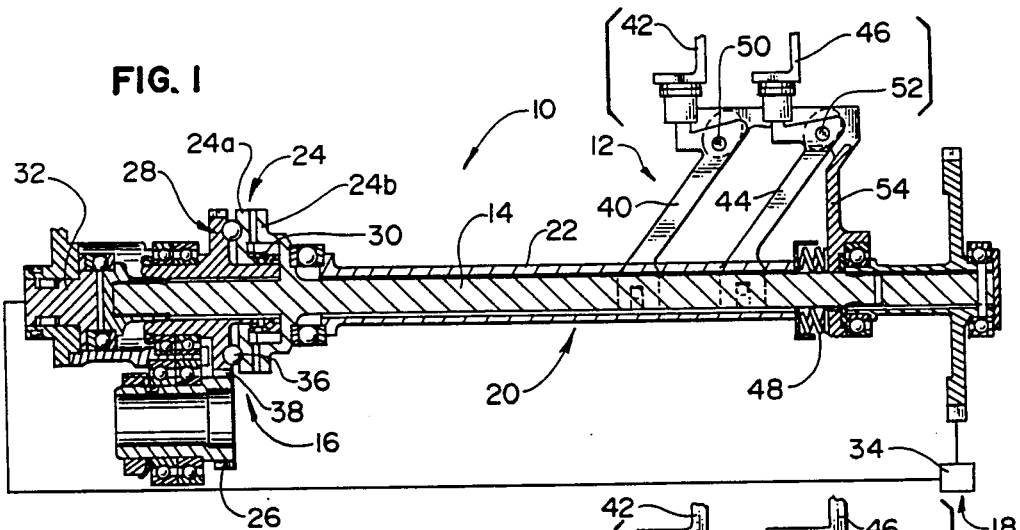
FIG. 1 is a cross sectional view illustrating a safety device for a drive unit in accordance with the present invention.

An exemplary embodiment of a safety device for a drive unit adapted for manual and powered driven movement of a drive shaft is illustrated in FIG. 1. The safety device 10 includes brake means as at 12 operably associated with the drive shaft 14 for preventing manual and powered driven movement of the drive shaft. It also includes manual input means as at 16 for releasing the brake means 12 and effecting manual driven movement of the drive shaft 14. The safety device 10 further includes powered input means as at 18 for releasing the brake means 12 and effecting powered driven movement of the drive shaft 14. With this construction, the safety device 10 is such that the powered input means 18 is operable to disengage the manual input means 16 before effecting powered driven movement of the drive shaft 14 in a manner that will be described in detail hereinafter.

Figure 2:
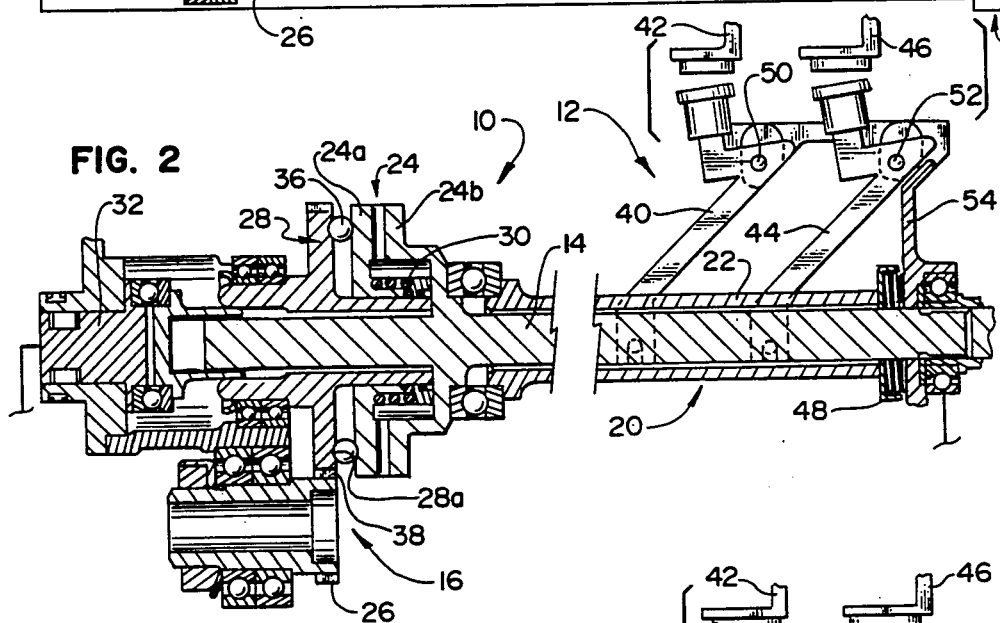
FIG. 2 is a cross sectional view similar to FIG. 1 illustrating the drive unit safety device during manual operation.

Still referring to FIG. 1, the drive unit generally designated 20 includes a spring compression shaft 22 coaxial with the drive shaft 14, and the spring compression shaft 22 and drive shaft 14 are axially movable for releasing the brake means 12 (see, also, FIG. 2). It will be appreciated and described further below that the drive shaft 14 is axially movable responsive to operation of the manual input means 16 and the powered input means 18. As shown in all of FIGS. 1 through 3, the brake means 12 includes brake actuation arms mounted on the compression shaft 22 for pivotal movement from an engaged brake position (see FIG. 1) to a released brake position (see FIGS. 2 and 3) such that axial movement of the drive shaft causes pivotal movement of the brake actuation arm.

In the embodiment illustrated in the drawings, the manual input means includes axially separable gear means such as the jaw clutch gear 24 operable through manual drive means such as the manual drive gear 26. The jaw clutch gear 24 includes a first gear portion 24a operably associated with the manual drive gear 26 and a second gear portion 24b operably associated with the drive shaft 14. As will be appreciated, the manual drive gear 26 is adapted to drive the drive shaft 14 through the first and second gear portions 24a and 24b.

More particularly, the manual input means 16 includes a ball ramp gear 28 disposed between the manual drive gear 26 and the first gear portion 24a of the jaw clutch gear 24. The first gear portion 24a of the jaw clutch gear 24 is operably associated with the manual drive gear 26 through the ball ramp gear 28. With this arrangement, biasing means such as the jaw clutch spring 30 is disposed between the first and second gear portions 24a and 24b to apply a biasing force tending to disengage them.

Figure 3:
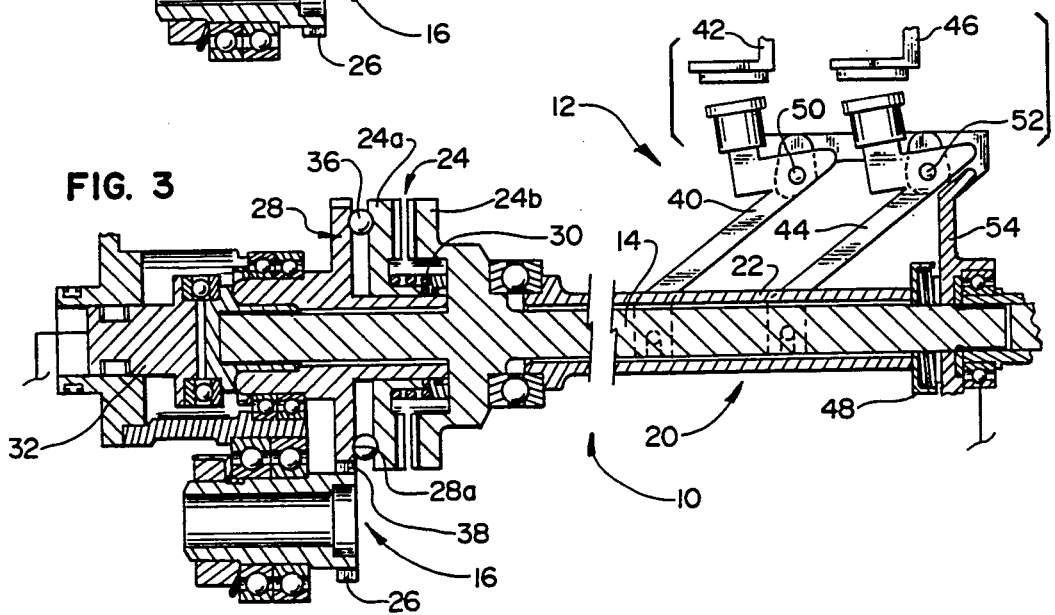
FIG. 3 is a cross sectional view similar to FIG. 2 illustrating the drive unit safety device during powered operation.

Referring to FIGS. 1 through 3, the powered input means generally designated 18 includes override means such as a hydraulic override piston 32 associated with the drive shaft 14 and the spring compression shaft 22. The hydraulic override piston 32 is adapted to move the drive shaft 14 and the spring compression shaft 22 axially for releasing the brake means (see FIG. 3). As will be appreciated, the powered input means generally designated 18 also includes motor means 34 for powered driven movement of the drive shaft 14 after the brake 12 has been released.

More specifically, the hydraulic override piston 32 is operable to axially move the drive shaft 14 and the spring compression shaft 22 during manual driven movement (see FIG. 2) so as to disengage the first and second gear portions 24a and 24b of the jaw clutch gear 24 in cooperation with the biasing means or jaw clutch spring 30 to isolate the manual drive gear 26 from the drive shaft 14 before powered driven movement of the drive shaft 14 by the motor means 34 can begin (see FIG. 3).

As shown in the drawings, the ball ramp gear 28 includes a ball ramp 28a in engagement with the first gear portion 24a of the jaw clutch gear 24 through a ball or balls 36. As will further be appreciated, the manual drive gear 26 is in engagement with the ball ramp gear 28 through meshing gear teeth as at 38 to transfer driving movement of the manual drive gear 26 to the ball ramp gear 28.

Based upon the foregoing, the hydraulic override piston 32 and the manual drive gear 26 can both be utilized to release the brake means 12. It will be appreciated that, in the embodiment illustrated, the brake means 12 includes a first brake actuation arm 40 and band brake 42 and a second brake actuation arm 44 and band brake 46 which are maintained in engagement as shown in FIG. 1 by means of the spring 48 which acts against the spring compression shaft 22 and, thus, the drive shaft 14 to pivot the respective brake actuation arms 40 and 44 about the pivot points 50 and 52, respectively, on the brake actuation arm support assembly 54 at all times except when there is either manual or powered operation. However, as best shown in FIG. 3, the jaw clutch gear 24 operates such that the first and second gear portions 24a and 24b are disengaged under powered operation by reason of the biasing force of the jaw clutch spring 30 coupled with the axial movement of the drive shaft 14 and the compression shaft 22.

In this connection, the hydraulic override piston 32 moves the drive shaft 14 and the spring compression shaft 22 axially to release the brake actuation arms 40 and 44 from engagement with the band brakes 42 and 46 during normal operation of the hydraulic override piston 32 and the motor means 34, i.e., powered operation. The ball ramp gear 28 remains axially fixed and, thus, the jaw clutch spring 30 causes the input and output of the jaw clutch 24, i.e., the first gear portion 24a and the second gear portion 24b, to separate and become disengaged. As a result of the separation of the input and output of the jaw clutch 24, i.e., the first and second gear portions 24a and 24b, rotation of the drive shaft 14 is isolated from the manual drive gear 26, i.e., the manual input means 16.

For manual operation, manual input to the manual drive gear 26 causes axial separation between the ball ramp gear 28 and the first gear portion 24a of the jaw clutch 24. This occurs by reason of the balls 36 rising up on the ramps in the respective components 24a and 28 which axially moves the spring compression shaft 22 against the action of the spring 48 to release the brake actuation arms 40 and 44 from engagement with the band brakes 42 and 46, i.e., the band brakes 42 and 46 are released. With the band brakes 42 and 46 released, the manual drive gear 26 can drive the drive shaft 14 through the engaged first and second gear portions 24a and 24b of the jaw clutch 24 to rotate the drive shaft 14.

If while manually driving the drive shaft 14, the hydraulic override piston 32 is energized, the drive shaft 14 and the spring compression shaft 22 will have additional axial movement (see FIG. 3) which will disengage the first and second gear portions 24a and 24b of the jaw clutch 30 to prevent harm to the manual operator through the manual drive gear 26.

In the embodiment illustrated in FIGS. 1 through 3, the band brakes 42 and 46 are for a door and pallet of a cargo aircraft. This application is merely illustrative, however, and not by way of limitation inasmuch as the unique features of the present invention can be utilized to provide safety for a manual operator of a drive unit where powered operation is activated and to eliminate flex jam failure modes inasmuch as a flex shaft to drive the manual drive gear 26 will be nonrotational during normal powered operation. In other words, the present invention is well suited as a safety device for any drive unit adapted for manual and powered driven movement of the drive shaft.

While in the foregoing there has been set forth a preferred embodiment of the invention, it is to be understood that the invention is only to be limited by the spirit and scope of the appended claims.

I claim:

1. A safety device for a drive unit adapted for manual and powered driven movement of a drive shaft, comprising:

brake means operatively associated with said drive shaft, said brake means normally being engaged, said brake means being released upon actuation of either manual or powered driven movement of said drive shaft;

manual input means for releasing said brake means and effecting the manual driven movement of said drive shaft; and powered input means for releasing said brake means and effecting the powered driven movement of said drive shaft;

said powered input means being operable to disengage said manual input means before effecting the powered driven movement of said drive shaft;

said manual input means including axially separable gear means operable through manual drive means, said axially separable gear means including a first gear portion operably associated with said manual input means and normally engaged with a second gear portion operably associated with said drive shaft, said manual drive means being operable through said axially separable gear means to drive said drive shaft when said first and second gear portions are engaged;

said manual input means also including a ball ramp gear disposed between said manual drive means and said first gear portion, said first gear portion being operably associated with said manual input means through said ball ramp gear, and including biasing means between said first and second gear portions applying a biasing force tending to disengage said first and second gear portions.

2. The safety device as defined by claim 1 wherein said drive unit includes a spring compression shaft coaxial with said drive shaft, said spring compression shaft and said drive shaft being axially movable for releasing said brake means.

3. The safety device as defined by claim 2 wherein said powered input means includes override means associated with said spring compression shaft and said drive shaft, said override means being adapted to move said spring compression shaft and said drive shaft axially for releasing said brake means, said powered input means also including motor means for powered driven movement of said drive shaft after said brake means has been released.

4. A safety device for a drive unit adapted for manual and powered driven movement of a drive shaft, comprising:

brake means operably associated with said drive shaft, said brake means normally being engaged, said brake means being released upon actuation of either manual or powered driven movement of said drive shaft;

manual input means for releasing said brake means and effecting the manual driven movement of said drive shaft; and powered input means for releasing said brake means and effecting the powered driven movement of said drive shaft;

said powered input means being operable to disengage said manual input means before effecting the powered driven movement of said drive shaft;

said drive unit also including a spring compression shaft coaxial with said drive shaft, said spring compression shaft and said drive shaft being axially movable for releasing said brake means;

said brake means including a brake mounted on said spring compression shaft for pivotal movement from an engaged brake position to a released brake position, said spring compression shaft and said drive shaft being axially movable responsive to operation of said manual input means and said powered input means, said brake being mounted on said spring compression shaft such that axial movement of said spring compression shaft and said drive shaft causes pivotal movement of said brake.

5. The safety device as defined by claim 4 wherein said manual input means includes axially separable gear means operable through manual drive means, said axially separable gear means including a first gear portion operably associated with said manual input means and normally engaged with a second gear portion operably associated with said drive shaft, said manual drive means being operable through said axially separable drive means to drive said drive shaft when said first and second gear portions are engaged.

6. The safety device as defined by claim 5 wherein said manual input means includes a ball ramp gear disposed between said manual drive means and said first gear portion, said first gear portion being operably associated with said manual input means through said ball ramp gear, and including biasing means between said first and second gear portions applying a biasing force tending to disengage said first and second gear portions.

7. The safety device as defined by claim 1 wherein said powered input means includes override means associated with said spring compression shaft and said drive shaft, said override means being adapted to move said spring compression shaft and said drive shaft axially for releasing said brake means, said powered input means also including motor means for powered driven movement of said drive shaft after said brake means has been released.

8. A safety device for a drive unit adapted for manual and powered driven movement of a drive shaft, comprising:

brake means operatively associated with said drive shaft, said brake means normally being engaged, said brake means being released upon actuation of either manual or powered driven movement of said drive shaft;

manual input means for releasing said brake means and effecting the manual driven movement of said drive shaft; and powered input means for releasing said brake means and effecting the powered driven movement of said drive shaft;

said powered input means being operable to disengage said manual input means before effecting the powered driven movement of said drive shaft;

said drive unit including a spring compression shaft coaxial with said drive shaft, said spring compression shaft and said drive shaft being axially movable for releasing said brake means;

said brake means including a brake mounted on said spring compression shaft for pivotal movement from an engaged brake position to a released brake position, said spring compression shaft and said drive shaft being axially movable responsive to operation of said manual input means and said powered input means, said brake being mounted on said spring compression shaft such that axial movement of said spring compression shaft and said drive shaft causes pivotal movement of said brake;

said powered input means including override means associated with said spring compression shaft and said drive shaft, said override means being adapted to move said spring compression shaft and said drive shaft axially for releasing said brake means, said powered input means also including motor means for powered driven movement of said drive shaft after said brake means has been released;

said manual input means including axially separable gear means operable through manual drive means, said axially separable gear means including a first gear portion operably associated with said manual input means and normally engaged with a second gear portion operably associated with said drive shaft, said manual drive means being operable through said axially separable gear means to drive said drive shaft when said first and second gear portions are engaged.

9. The safety device as defined by claim 8 wherein said manual input means includes a ball ramp gear disposed between said manual drive means and said first gear portion, said first gear portion being operably associated with said manual input means through said ball ramp gear, and including biasing means between said first and second gear portions applying a biasing force tending to disengage said first and second gear portions.

10. The safety device as defined by claim 9 wherein said override means is operable to axially move said spring compression shaft and said drive shaft during manual driven movement so as to disengage said first and second gear portions in cooperation with said biasing means to isolate said manual drive means from said drive shaft before powered driven movement of said drive shaft by said motor means.

11. The safety device as defined by claim 10 wherein said axially separable gear means is a jaw clutch gear, said ball ramp gear including a ball ramp in engagement with said first gear portion of said jaw clutch gear through a ball, said manual drive means including a manual drive gear in engagement with said ball ramp gear through meshing gear teeth, and said override means comprising a hydraulic override piston.

* * * * *